Oct. 9, 1928.

H. H. TRAIL 1,687,047

BRAKE OPERATING MECHANISM

Filed Oct. 22, 1925   2 Sheets-Sheet 1

H.H. Trail
INVENTOR
By: Marks & Clerk
Attys

Oct. 9, 1928.

H. H. TRAIL 1,687,047

BRAKE OPERATING MECHANISM

Filed Oct. 22, 1925    2 Sheets-Sheet 2

H. H. Trail
INVENTOR
By: Marks & Clerk
Attys

Patented Oct. 9, 1928.

1,687,047

UNITED STATES PATENT OFFICE.

HERBERT HORATIO TRAIL, OF VANCOUVER, BRITISH COLUMBIA, CANADA.

BRAKE-OPERATING MECHANISM.

Application filed October 22, 1925. Serial No. 64,249.

This invention relates to operating means for the brakes of automobiles of the kind in which reduced air pressure is utilized to cause actuation of the brake. The invention is therefore especially suitable for application to heavy automobiles, trucks and omnibuses as the use of reduced air pressure relieves the driver from the necessity of expending the considerable amount of energy required to apply a hand or foot operated brake of a customary type.

The invention has for its principal object to provide an improved valve mechanism for establishing communication between the brake operating means and a source of reduced pressure to apply the brake to the desired degree, or to establish communication between the brake operating means and the atmosphere to release the brake. According to the invention the improved mechanism may comprise a valve chamber having an internal seat, a port on each side of said seat, a valve biassed towards said seat, a passage adapted to be subjected to sub-atmospheric pressure, and a manually operable controlling member adapted to be moved into engagement with the valve and thereby close said passage, continued movement of the controlling member in the same direction causing said valve to be moved away from its seat, the arrangement thus ensuring that the valve is unseated only when said passage is closed, and that the passage is open only when the valve is seated.

The invention also embodies certain improved constructional features which render the mechanism more simple to manufacture and more efficient and reliable in operation.

The invention consists in the combination and arrangement of parts to be hereinafter described and more particularly pointed out in the appended claims.

Figure 1:
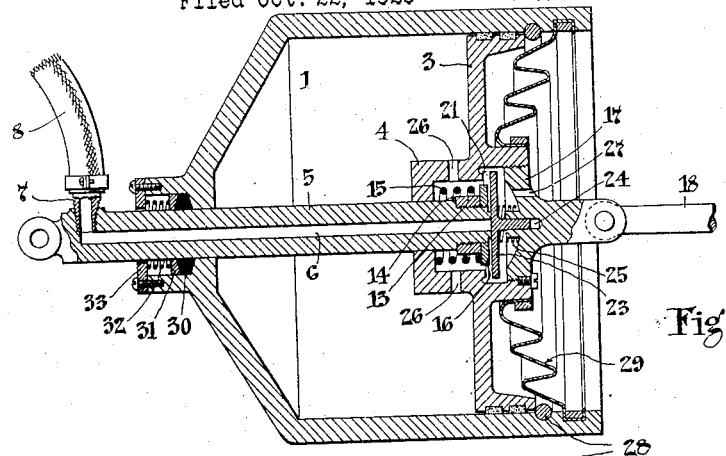
Figure 2:
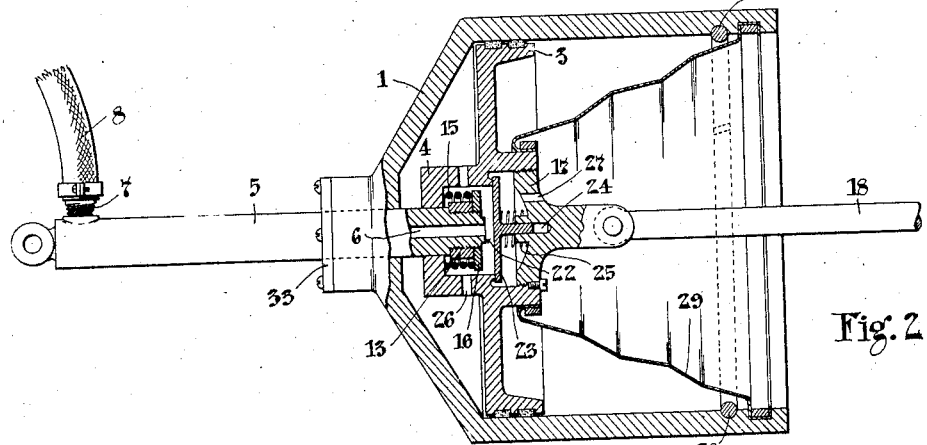
Figure 3:
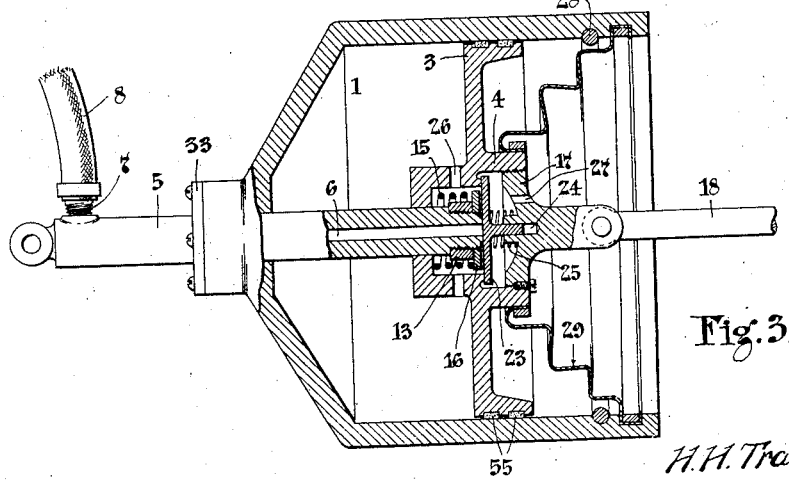
Figure 8:
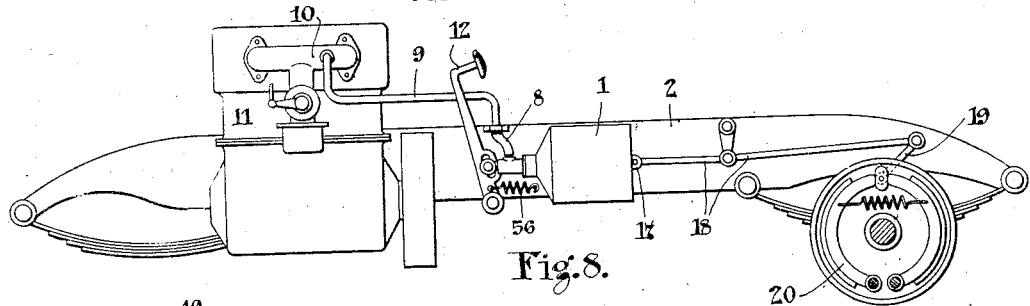
Figure 7:
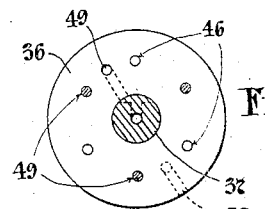
Figure 4:
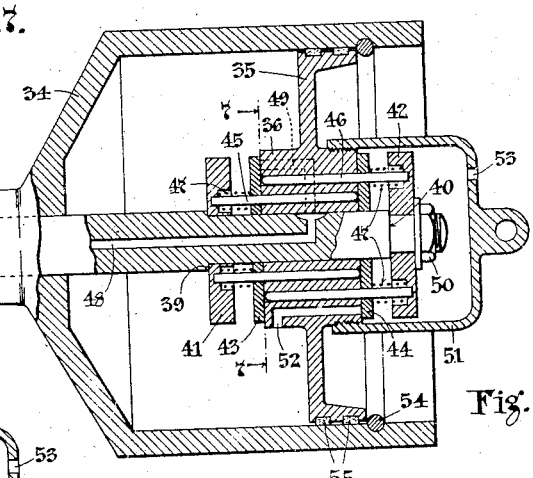
Figure 6:
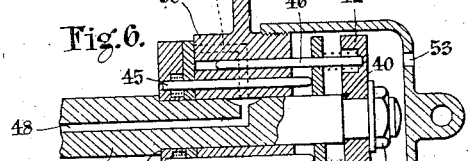
Figure 5:
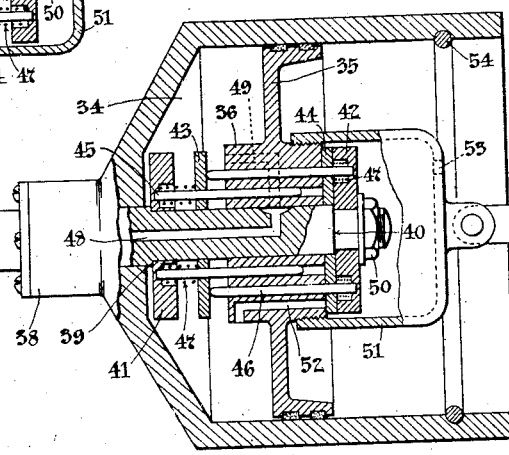

Referring now to the accompanying drawings which illustrate by way of example two suitable embodiments of the invention, Figure 1 is a longitudinal sectional elevation of one form of the invention showing the parts in the normal position, Figure 2 is an elevation partly in section showing the parts in the operative position when the brake is fully applied, Figure 3 is a view similar to Figure 2 showing the parts in a position intermediate the positions shown in Figures 1 and 2, Figure 4 is a longitudinal sectional elevation of another form of the invention showing the parts in the normal position, Figure 5 is a view similar to Figure 4 showing the parts in the operative position, Figure 6 is a fragmentary sectional elevation showing the position of the parts intermediate the positions shown in Figures 4 and 5, Figure 7 is a detail view which is substantially a cross section on the line 7—7 of Figure 4 and Figure 8 is a view illustrating the application of the invention to the engine and brake of an automobile.

The form of the invention shown in Figures 1, 2 and 3 comprises a cylinder 1 which is mounted in any suitable manner on the frame 2 of an automobile as indicated in Figure 8. Within the cylinder 1 is mounted a piston 3 which is formed at its centre with a chamber 4. The front end of the casing 4 is centrally bored to receive a rod 5 having a longitudinal passage 6 which is connected through a nipple 7, flexible tube 8, and pipe 9, with the intake manifold 10 of the engine 11 of an automobile.

The forward end of the rod 5 is formed with an eye which is pivotally connected to an operating lever which may conveniently be in the form of a pedal 12 is shown in Figure 8. The inner end of the rod 5 carries a collar or sleeve 13 of larger diameter than the rod 5 so as to form a shoulder 14 capable of engaging the forward end of the chamber 4 under certain conditions to be referred to hereinafter. The rod 5 is held in the normal position shown in Figure 1 by means of a spring 15 which is compressed between the end wall of the chamber 4 and a flange or nut 16 on the inner end of the rod 5. The piston is connected to the brake to be operated in any suitable manner. For example a member 17 may be screwed into the rear end of the chamber 4 and connected by means of rods 18 to the operating lever 19 of a brake 20.

A valve seat 21 is formed between the ends of the chamber 4 and the inner end of the rod 5 is also machined to form a valve seat 22. Co-acting with these two seats is a disc valve 23 formed with a stem adapted to slide in a bore 24 in the member 17, and a light compression spring 25 is provided to urge the valve 23 towards the seats.

The chamber 4 and the member 17 are perforated as at 26 and 27 respectively so that the interior of the cylinder 1 in front of the piston 3 is normally in communication with the atmosphere as shown in Figure 1 and the brake spring therefore holds the piston normally in its rearward position as shown in Figure 1, means, such as a ring 28, being provided to limit to rearward movement of the piston 3. The ring 28 may conveniently be of circular cross-section and split so as to be fitted into a semi-circular groove in the cylinder as shown.

A flexible guard 29 may be provided to prevent the entrance of dust, mud or other foreign matter into the cylinder.

The rod 5 may pass through the cylinder 1 through a stuffing box, such as that shown in Figure 1, which consists of packing 30, a ring 31 and a spring 32 held in compression by means of an annular plate 33.

The operation of this form of the invention wil now be described.

As hereinbefore mentioned the normal or non-braking position of the parts is shown in Figure 1. In this position the valve 23 is in contact with the seat 22 of the rod 5 thus closing the end of the passage 6. The brake spring holds the piston against the ring 28 and the spring 15, being stronger than spring 25, forces the seat 22 against the valve 23 and raises the latter from the seat 21, thus establishing communication between the interior of the cylinder 1 and the atmosphere through the holes 26 and 27.

Assuming that the automobile is travelling and the engine is rotating, it will be understood that a sub-atmospheric pressure will exist in the intake manifold and consequently in the passage 6 in the rod 5. When the brake is to be applied the pedal 12 is depressed and this action causes a forward movement of the rod 5 against the action of the spring 15. The rod 5 moves relatively to the chamber 4 and the valve 23 therefore follows the rod 5 until the valve becomes seated on seat 21 and thus cuts off the cylinder 1 from the atmosphere. Continued forward movement of the rod 5 lifts the seat 22 from the valve 23 and thus establishes communication between the cylinder and the engine manifold by way of hole 26, chamber 4, passage 6, hose 8 and pipe 9 as shown in Figure 2. The consequent lowering of the air pressure in the cylinder 1 permits the atmospheric pressure to act on the rear of the piston and force the latter forward and thereby cause tensioning of the rods 18 and application of the brake. In this way the piston is caused to follow the rod 5 so long as the latter is being advanced by means of the pedal 12. The brake will therefore be applied to a degree corresponding to the distance the driver advances the rod 5. The brake may be applied fully as indicated in Figure 2 or partially as indicated in Figure 3. When the rod has been advanced and is being held in the advanced position, the piston will continue to move forward a short distance owing to the different pressure existing on opposite sides of the piston, but this continued movement will almost immediately cause the valve 23 to engage seat 22 and close the passage 6 and thus cut off the source of reduced pressure from the cylinder, as indicated in Figure 3.

When the brake is to be released it is merely necessary to release the pedal 12. The spring 15 then thrusts the rod rearwardly and causes the valve 23 to be raised from seat 21. Atmospheric pressure is thus re-established in the cylinder 1 and the brake spring draws the piston and parts carried thereby back to the normal position shown in Figure 1.

It will be noticed that should the reduced pressure in passage 6 fail for any reason, or should it be desired to apply the brake when the engine is not running, it is still possible to apply the brake by manual or foot pressure, as in such event the shoulder 14 will come into contact with the front wall of the chamber 4 and thus establish a direct mechanical connection between the pedal and brake.

The modification shown in Figures 4, 5 and 6 comprises a cylinder 34 in which a piston 35 is slidably mounted. The piston is formed with a central boss 36 which is centrally bored to receive the reduced rear end of a rod 37 which extends out of the front end of the cylinder through a stuffing box 38 which may be constructed as shown in Figure 1 or otherwise. The rod 37 is formed with spaced shoulders 39 and 40 against which are mounted discs 41 and 42 respectively. Between the disc 41 and the boss 36 a ring 43 is loosely mounted on the rod 37 and a similar ring 44 is mounted between the boss 36 and the disc 42. A plurality of small rods 45 carried by the disc 41 project slidably through aligned bores in the ring 43 and boss 36. A similar series of small rods 46 carried by the disc 42 project slidably through aligned bores in the ring 44 and boss 36. The rings 43 and 44 are biassed away from their respective discs 41 and 42 by means of light compression springs 47. The rod 37 has a central passage 48 which communicates with the engine intake manifold through the hose 8 as in Figure 8. In this form the inner or rear end of the passage 48 coacts with a port 49 in the boss 36. The port opens at one end into the bore in the boss opposite the end of the passage 48 and at the other end into the cylinder 34 in front of the piston.

The disc 42 is held in place as by a nut 50. A cap member 51 is screwed on the rear of the boss 36 and this member is connected to the brake operating lever 19 by means of the rods 18. A passage 52 is formed in the boss 36 and a hole 53 in the member 51. The rearward movement of the piston may be limited by any suitable means such as a ring 54.

For purposes of illustration the rods 45 are shown in Figures 4, 5 and 6 as being closer to the axis of the rod 37 than the rods 46, but in practice the rods 45 and the rods 46 may be all arranged at the same radial distance from the axis as indicated in Figure 7.

The piston is provided with devices such as cork rings 55 so that the piston will fit the cylinder in a fluid-tight manner with a minimum of friction.

The operation of this form of the invention is as follows:—

The parts are normally in the position indicated in Figure 4 in which atmospheric pressure exists in the cylinder 34 and the valve rings 43 and 44 are pressed against the passages 49 and 52 respectively so that the interior of the cylinder is cut off both from the engine and the atmosphere.

When the pedal 12 is depressed the rod 37 is moved forward. The consequent forward movement of disc 42 moves the rods 46 forward and these rods thrust the valve disc 43 away from the outer end of passage 49 thus connecting the interior of the cylinder with the engine intake 10. The reduction of pressure in the cylinder causes the piston 35 to move forward the same distance as the rod 37 is advanced by depression of the pedal 12, for example, to the position shown in Figure 5 in which the control rod 37 is shown in its extreme forward position.

Upon releasing the pedal 12 a spring 56, indicated in Figure 8, returns the pedal 12 and rod 37 back to normal position. The rearward movement of the rod 37 forces disc 41 against valve ring 43 and the valve ring is thus caused to close the passage 49 to cut the cylinder off from the engine. Simultaneously the rods 45 press the valve ring 44 away from the end of passage 52 and thereby cause atmospheric pressure to be re-established in the interior of the cylinder 34, as shown in Figure 6. The spring 56 moves the rod back to the position shown in Figure 1 and thereafter the brake spring continues the rearward movement of the piston the short distance necessary to bring it also to the position shown in Figure 1.

It will be noticed that in this modification also, the brake may, in emergency, be operated by manual or foot pressure, since if the reduction of air pressure fails or the engine is not rotating, the pressure on the lever 12 is transmitted to the brake through the rod 37, disc 42, ring 44, boss 36 and member 51 to the brake rods 18.

The spring 56 shown in Figure 8 is required only for the form of the invention shown in Figures 4, 5 and 6 and is not needed for the form shown in Figures 1, 2 and 3.

It will be noticed that by the use of the invention the brakes are operated by means of the engine, and the driver is thereby relieved of the necessity of expending the energy needed to operate brakes of the customary type. At the same time it is not desirable to render the operation entirely effortless or the operation of controlling the application of the brake would be difficult. While relieving the driver of all fatiguing effort, the friction and various spring pressures nevertheless provide just sufficient resistance to the driver's foot or hand to enable him to control the operation of the brake steadily and to apply the brake to any desired degree.

It will be understood that the foregoing description is given by way of example only and that any modifications within the scope of the appended claims may be made without departing from the spirit of the invention.

In the claims the term "cylinder space" or similar terms mean the space between the piston and the closed end of the cylinder.

What I claim is:—

1. Brake operating mechanism comprising a valve chamber having two parts of different diameters, a valve seat at the junction of said parts of different diameters, a valve biassed towards said seat, a port connecting the part of larger diameter with the atmosphere, a port communicating with the part of smaller diameter, a passage adapted to be subject to sub-atmospheric pressure, and an axially movable controlling member adapted in one position to engage said valve and thereby cause closure of said passage and unseating of said valve and in another position to be withdrawn from engagement with said valve whereby the valve is permitted to engage its seat and said passage is opened.

2. Brake operating mechanism comprising a valve chamber, a valve seat in said chamber, a valve, means biassing said valve towards said seat, a passage subject to sub-atmospheric pressure, and an axially movable controlling member adapted normally to project into engagement with said valve and thereby close said passage and hold said valve clear of its seat, the withdrawal of said controlling member permitting said valve to engage its seat and thereafter causing opening of said passage.

3. Brake operating mechanism comprising a valve chamber having an internal seat, a port on each side of said seat, a valve biassed towards said seat, a passage adapted to be subjected to sub-atmospheric pressure, and a manually operable controlling member adapted to be moved into engagement with the valve and thereby close said passage, continued movement of the controlling member in the same direction causing said valve to be moved away from its seat, the arrangement thus ensuring that the valve is unseated only when said passage is closed, and that the passage is open only when the valve is seated.

4. Brake operating mechanism comprising a cylinder open at one end, a piston slidingly mounted in said cylinder, a valve chamber movable with the piston, a valve seat in said chamber, a valve in said chamber, resilient means biassing said valve towards said seat, a port connecting one end of said valve chamber to the atmosphere, a second port connecting the other end of said chamber to the space between the piston and the closed end of said cylinder, a manually operated controlling member slidingly projecting into that end of said valve chamber with which said second port communicates, and a passage adapted to be subjected to sub-atmospheric pressure, the inner end of said passage opening into the space between the valve and the inner end of the controlling member when the latter is withdrawn from engagement with said valve.

5. Brake operating mechanism as claimed in claim 4, wherein the inner end of said controlling member is provided with a flange capable of limiting the distance which the controlling member can be moved away from the valve.

6. Brake operating mechanism as claimed in claim 4, wherein the inner end of the controlling member is provided with a flange forming an abutment for a spring which tends to urge the inner end of the controlling member into engagement with said valve.

7. Brake operating mechanism comprising a cylinder, a piston in said cylinder, a chamber at the centre of said piston, a control rod extending into said chamber and capable of limited axial movement with respect thereto and having a passage adapted to connect said chamber with a source of sub-atmospheric pressure, a port connecting the chamber and cylinder space, a second port connecting the chamber and atmosphere, a valve seat intermediate said ports, a valve spring-pressed away from the second port and towards said seat, spring means for normally urging said control rod to cause closure of the inner end of said passage and to unseat the valve, and means whereby said rod can be moved axially when desired to permit the valve to become seated and the rod to thereafter move away from the valve and thereby establish communication between the passage and the chamber.

8. Brake operating mechanism comprising a cylinder, a piston having a central chamber and two ports connecting the chamber with the cylinder space and atmosphere, respectively, a valve seat in said chamber in a plane between said ports and having its seating surface facing toward the atmospheric port, a valve biassed towards said seat and a control rod having a passage adapted to be connected to a source of sub-atmospheric pressure and adapted to be moved out of contact with said valve to establish communication between said passage and cylinder space and permit the valve to engage said seat, or to contact with said valve and thereby close said passage and unseat the valve to establish communication between the cylinder space and the atmosphere.

9. Brake operating mechanism comprising a cylinder closed at one end, a piston slidable in a substantially air-tight manner in said cylinder, a recess in said piston, an annular flange on said piston, said recess and flange being coaxial with each other and with the piston, a rearwardly facing annular seat at the junction of said recess and flange, a member secured to said flange, provision on said member for connecting it to the brake to be operated, a disc-like valve, a stem on said valve slidable in a bore in said member, a spring pressing said valve towards said seat, a control rod slidable in a substantially air-tight manner, through the front wall of the cylinder and into the recess in said piston and having a longitudinal passage, an annular seat surrounding the inner end of said passage, two forwardly facing shoulders of different diameters on the rear end of said control rod, a spring engaging said shoulder of larger diameter and of sufficient strength to press the seat on the rod against the valve and press the latter from the annular seat on the piston, a port connecting the cylinder space with the recess in the piston and a port connecting the interior space of the flange with the atmosphere.

In testimony whereof I affix my signature.

HERBERT HORATIO TRAIL.